(No Model.)
G. H. HUTTON, Jr.
JUMP SEAT FOR VEHICLES.
No. 581,992. Patented May 4, 1897.
3 Sheets—Sheet 1.
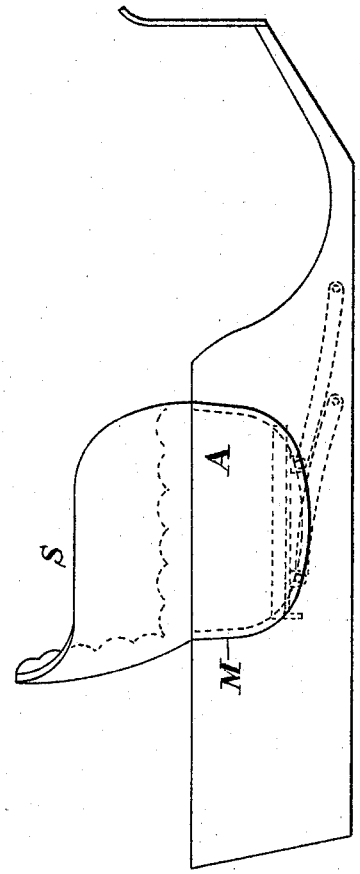
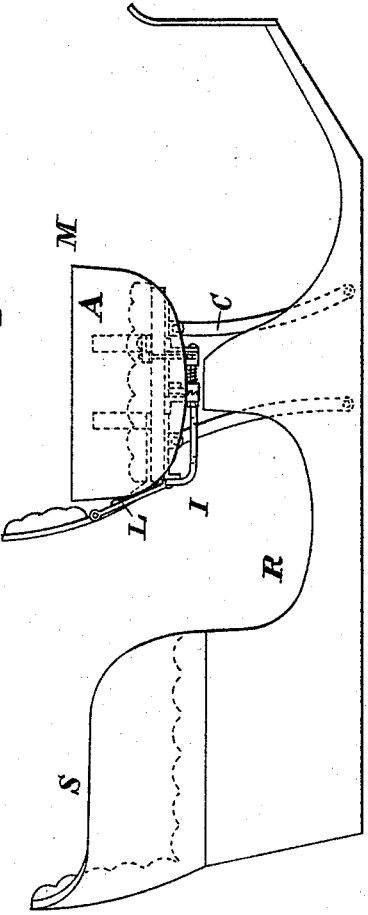
WITNESSES :—
Charles B. Mann Jr.
Chapin A. Ferguson.
INVENTOR :—
George H. Hutton Jr.
By
Chas B. Mann
ATTORNEY.

(No Model.) 3 Sheets—Sheet 2.
G. H. HUTTON, Jr.
JUMP SEAT FOR VEHICLES.
No. 581,992. Patented May 4, 1897.
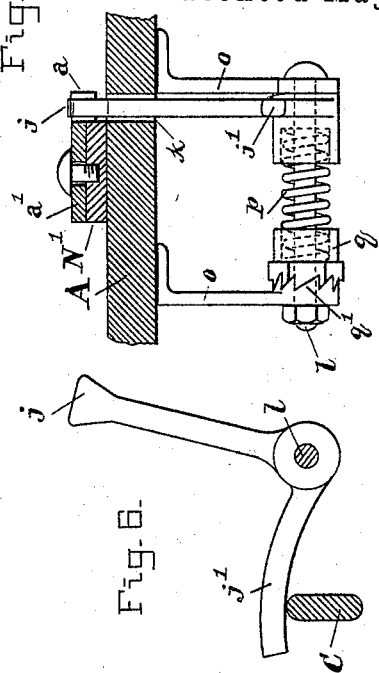
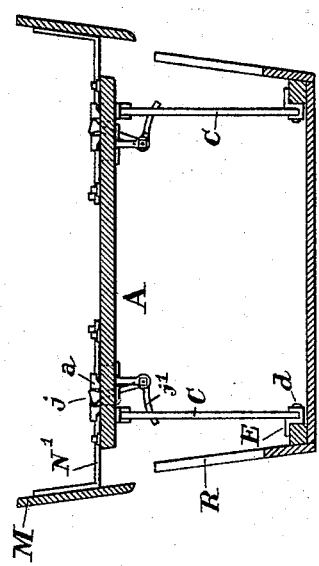
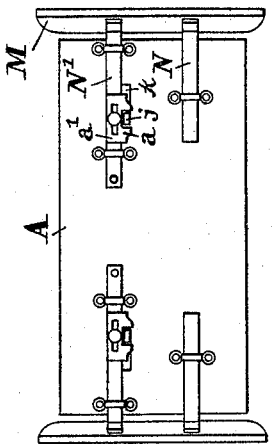
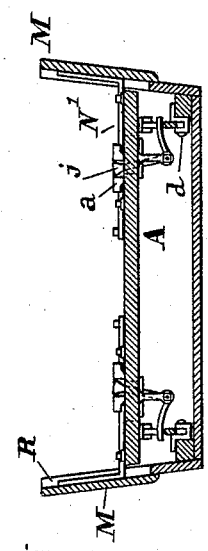
WITNESSES:—
Charles B. Mann Jr.
Chapin A. Ferguson.
INVENTOR:—
George H. Hutton Jr.
By
Chas. B. Mann
ATTORNEY (No Model.)   3 Sheets—Sheet 3.
G. H. HUTTON, Jr.
JUMP SEAT FOR VEHICLES.
No. 581,992.   Patented May 4, 1897.
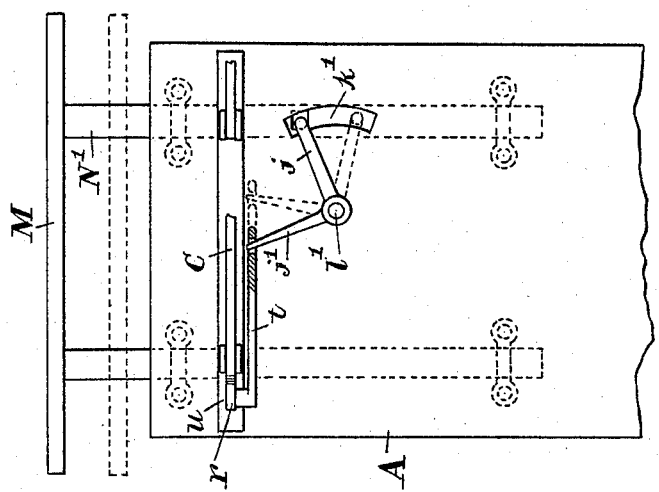
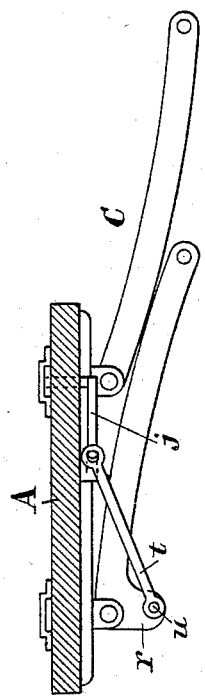
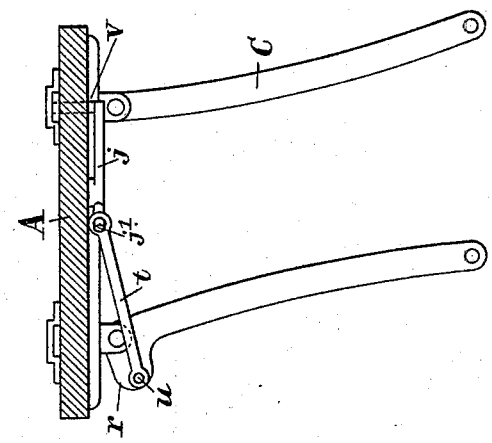
WITNESSES:
Charles B. Mann Jr.
Chapin A. Ferguson.
INVENTOR:
George H. Hutton Jr.
By Chas. B. Mann
ATTORNEY.

UNITED STATES PATENT OFFICE.

GEORGE H. HUTTON, JR., OF BALTIMORE, MARYLAND.

JUMP-SEAT FOR VEHICLES.

SPECIFICATION forming part of Letters Patent No. 581,992, dated May 4, 1897.

Application filed December 26, 1896. Serial No. 616,965. (No model.)

*To all whom it may concern:*

Be it known that I, GEORGE H. HUTTON, Jr., a citizen of the United States, residing at Baltimore, in the State of Maryland, have invented certain new and useful Improvements in Jump-Seats for Vehicles, of which the following is a specification.

This invention relates to improvements in jump-seat vehicles, and to that class in which the sides of the front seat are extended so as to lengthen the seat when in use and contracted so as to shorten the seat when the latter is folded down and below the back seat.

My invention presents a new construction and combination by means of which I secure the movement of the seat sides independent of the seat-back by utilizing the movement of the seat-legs.

Referring to the accompanying drawings for illustrations of my invention, Figure 1 shows a side elevation of a vehicle-body having my invention and adjusted to use a single seat. Fig. 2 is a similar view, but adjusted to use both seats. Fig. 3 is a cross-section of the vehicle-body and front seat folded down and with the sides contracted. Fig. 4 shows a cross-section of the vehicle-body and front seat raised and seat sides extended. Fig. 5 is a top view of the front seat. Figs. 6 and 7 are details showing the bell-crank lever employed in Figs. 3, 4, and 5 as one means for communicating movement between the seat sides and seat-legs. Figs. 8, 9, and 10 illustrate a modified form of embodying my invention.

I here show a swinging leg-iron I and a hinged seat-back constructed and operating substantially as shown and described in Letters Patent of the United States No. 481,358, dated August 23, 1892. In order to make my present invention clear and more conspicuous, I have omitted from the detail drawings the parts comprising said swinging leg-iron and hinged seat-back.

Each side of the vehicle-body has a cut-out space R between the back seat and front seat. The back seat S has pivoted legs (not shown, but like those ordinarily used in this class of vehicles) to permit said seat to be "jumped" from the rear double-seat position shown in Fig. 2 to the more forward single-seat position shown in Fig. 1. The front seat A is mounted on legs C, pivoted to the seat and at $d$ to a base-plate E on the carriage-body frame. A swinging iron I is under each end of the seat (see Fig. 2) and has the usual stop-lugs to engage said legs and thereby sustain the seat in its elevated position. The front seat has a back F, supported by jointed irons to allow said back to turn forward toward the seat. The seat-back F and the swinging lug-iron I are connected by a rod L, whereby on tilting the seat-back forward the lug-iron will swing outward away from the legs and disengage the stop-lugs from the legs.

The sides M of the front seat are extended so as to lengthen the seat. These sides are supported by irons or arms N N', which slide on the seat, as plainly shown in the drawings.

All the parts thus far mentioned are like the same parts described in said Patent No. 481,358.

Means for the movement outward and inward of the seat sides M is the subject of my present invention. I provide a new combination whereby this is done by utilizing the movement of the seat-legs when raising and lowering the front seat. The sliding arms N' are each provided with two side shoulders $a$, between which one end $j$ of a bell-crank lever has position. These two shoulders enable the end of this lever to push and pull the arm N' and thereby to move the sides M. These shoulders may be formed on the arm in any suitable way. In the present instance they are part of a separate casting $a'$, which is riveted or screwed to the arm N'. A slot $k$ is in the seat, and the end $j$ of the lever projects up through this slot to the arm and shoulders $a$, which are on the upper surface of the seat.

The bell-crank lever $j j'$ is loose on a pin $l$, which is supported in two hangers $o$ below the seat. A spiral spring $p$ around the pin has one end fixed to the hub of the bell-crank and the other end fixed to a ratchet-head $q$, also on the pin $l$, but loose, so as to turn thereon. This ratchet-head engages teeth $q'$ on one of the hangers, and by turning said head the spiral spring may be tightened should it become necessary. This spring serves to throw the bell-crank lever in one direction—that is, to extend the sides M at the time the front seat is being raised. The bell-crank lever is thrown in the opposite direction—that is, to retract or draw in the sides—by one end $j'$ of said lever contacting with the leg C of the seat when lowering the latter. Thus when the front seat is nearly lowered the movement of the seat-legs is utilized to retract the sides M.

In Figs. 8, 9, and 10 another construction is shown for carrying out my invention. Here a bell-crank lever is used, but it moves in a horizontal plane instead of a vertical plane, as in the other figures. This lever is pivoted at $l'$ directly on the bottom of the seat A. One seat-leg C has a short projecting part $r$ at its upper end, and a link-bar $t$ has one end jointed at $u$ to said projection on the leg and the other suitably connected with the end $j'$ of the bell-crank lever. The other end $j$ of this lever has a lateral or upward-pointing prong $v$, which projects through a slot $k'$ in the seat and engages the arm N'. In this case the movement of the seat-legs is utilized to shift the sides M both for extending and retracting. No spring in this case is employed. Obviously other modifications may be made.

The front-seat sides M have the same shape as at the cut-out spaces R in the body, but the seat sides are larger and in this mechanism the construction and operation are such that said seat sides M do not fit into the cut-out spaces R, as in the patent before referred to, but the sides are larger than the spaces and fit over said cut-out spaces like a cover, as indicated by broken lines in Fig. 2 and shown in Fig. 3. In the mechanism here shown when adjusting the front seat to the down position and when said seat is nearly down the sides M are drawn inward and are pressed against the outer walls of the body around the cut-out spaces by the final movement of the seat-legs. In this organization of cut-out space, front seat, and sides M to fit over the spaces like a cover the complete retraction of the sides M when lowering the front seat must be deferred until the front seat is nearly down. This fact renders the seat-back movement which has heretofore been employed for actuating extensible seat sides inconvenient. By utilizing the movement of the seat-legs to retract the sides M independently of the seat-back the operation of lowering the front seat is effected with much more convenience.

The drawing the seat sides M when the seat is down against the outer walls of the body around the spaces is believed to be new, and my invention covers combinations to effect that result.

Having thus described my invention, what I claim is—

1. The combination of a seat mounted on pivoted legs so as to be raised and lowered; extensible seat sides supported by slide-arms on the seat; and mechanism for moving said seat sides outward and retracting them when the seat is being lowered, which mechanism is actuated by the said pivoted legs.

2. The combination of a vehicle-body having a front seat and a back seat and a cut-out open space in the sides of the body between the front and back seats; the said front seat mounted on pivoted legs so as to be raised and lowered; extensible seat sides supported by arms sliding on said front seat and being larger than said cut-out spaces and adapted to take on the outside of the body and fit over said spaces like a cover; and mechanism for moving said seat sides outward and inward and which when lowering the seat draws the sides against the outer walls of the body around said spaces.

3. The combination of a vehicle-body having a front seat and a back seat and a cut-out open space in the sides of the body between the front and back seats; the said front seat mounted on pivoted legs so as to be raised and lowered; extensible seat sides supported by arms sliding on said front seat and being larger than said cut-out spaces and adapted to take on the outside of the body and fit over said spaces like a cover; and means to draw said seat sides close against the outer walls of the body.

In testimony whereof I affix my signature in the presence of two witnesses.

GEORGE H. HUTTON, JR.

Witnesses:
   CHAPIN A. FERGUSON,
   CHARLES B. MANN, Jr.